March 26, 1957 K. S. ROBERTS 2,786,339
PORTABLE FROZEN FOOD DISPLAY CABINET
Filed Nov. 12, 1954 3 Sheets-Sheet 1

INVENTOR.
Kenneth S. Roberts
BY
Brown, Jackson, Boettcher & Dienner,
Attys

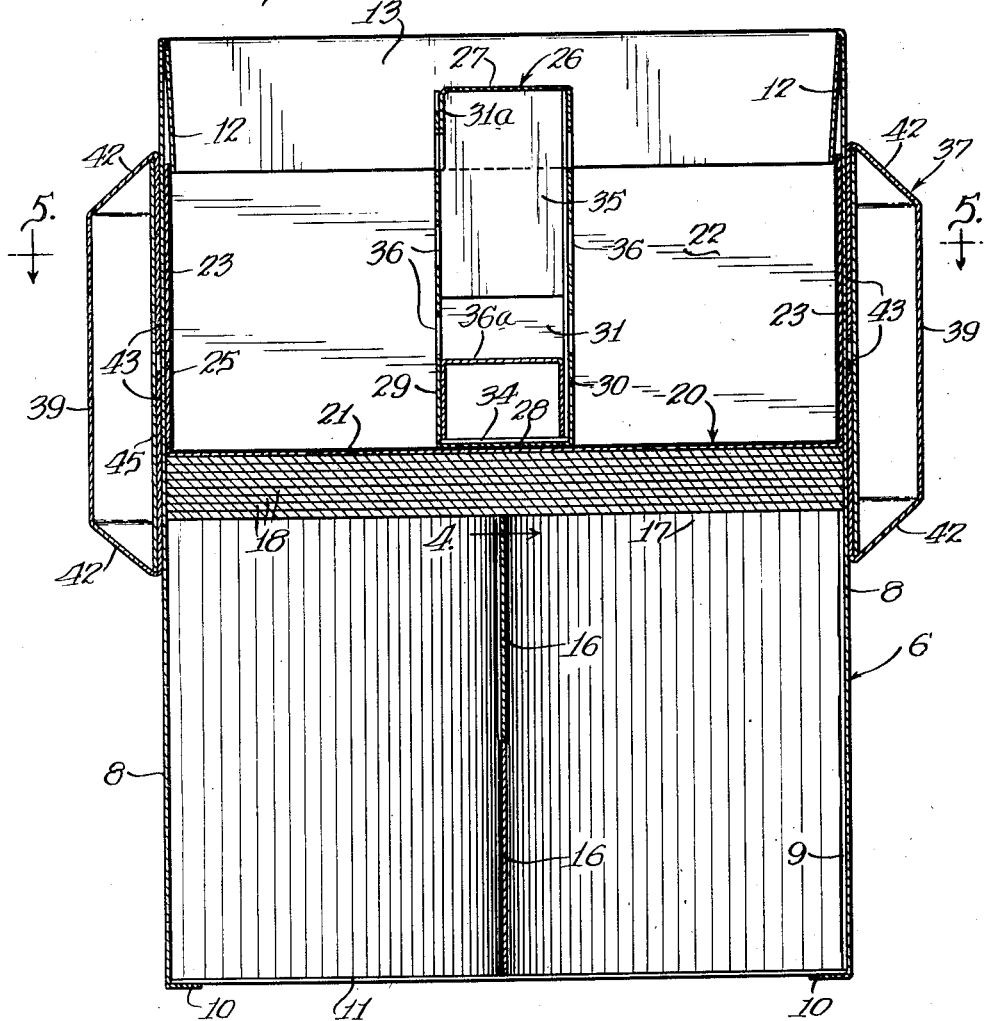

March 26, 1957 K. S. ROBERTS 2,786,339
PORTABLE FROZEN FOOD DISPLAY CABINET
Filed Nov. 12, 1954 3 Sheets-Sheet 3
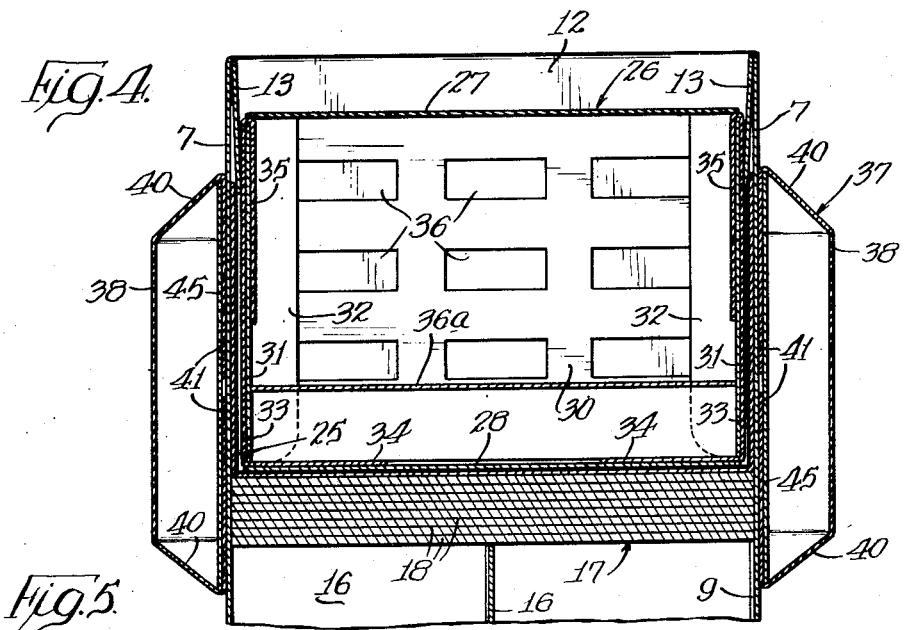
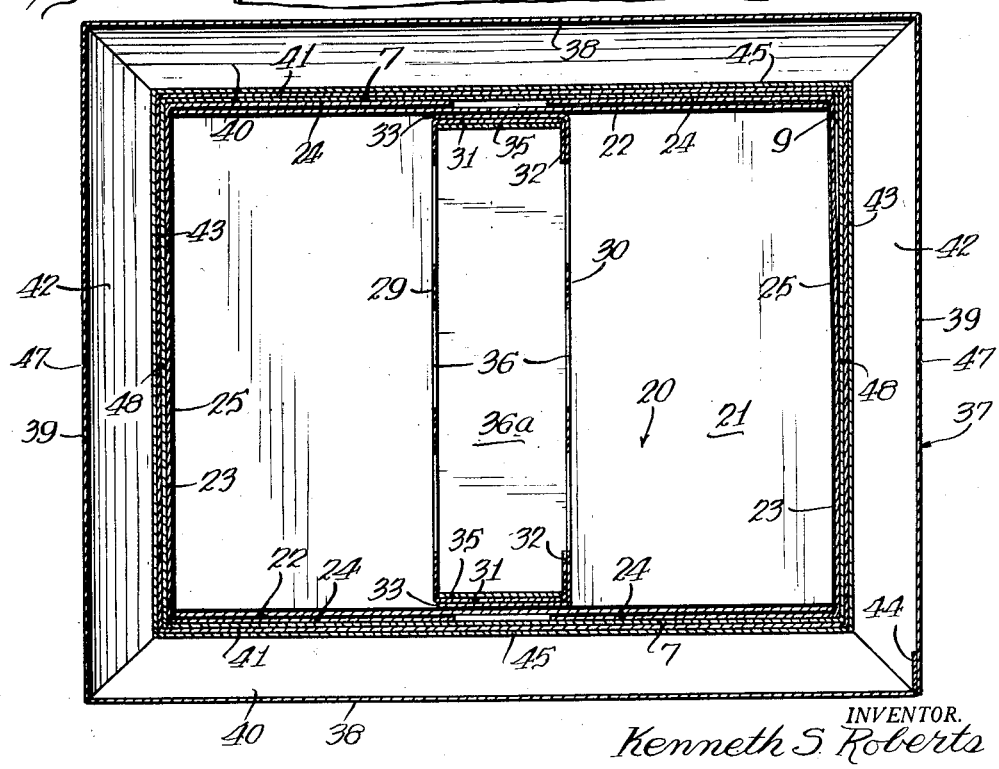
INVENTOR.
Kenneth S. Roberts
BY
Brown, Jackson, Boettcher & Dienner
Attys.

United States Patent Office 2,786,339
Patented Mar. 26, 1957

2,786,339

PORTABLE FROZEN FOOD DISPLAY CABINET

Kenneth S. Roberts, Chicago, Ill., assignor to Container Corporation of America, Chicago, Ill., a corporation of Delaware Application November 12, 1954, Serial No. 468,261

9 Claims. (Cl. 62—89.5)

This invention relates to display devices, and has to do with a portable cabinet for displaying frozen foods and analogous articles.

It is well known to provide, in stores or markets dealing in comestibles, open top refrigerated containers or cabinets for the display and sale of foods and analogous articles. Such cabinets usually are permanently installed at predetermined locations, are connected to stationary refrigerating means, and are of substantial weight. They are, therefore, fixed in locations and are not readily movable. In many food stores and markets it frequently is desirable to push a certain article of frozen food by means of a special display, or in connection with a special sale of some other article. It is desirable, for that purpose, that the frozen food or analogous article to be pushed be placed or spotted in the store or market at a strategic location, or locations, while being effectively refrigerated to maintain it in a wholesome and attractive condition. The presently known refrigerated cabinets, above referred to, obviously are not readily portable and are not suitable for special display purposes at different selected locations. My invention is directed to a display cabinet for frozen foods which is attractive in appearance, of comparatively light weight, so as to be readily portable, and is effectively refrigerated for a length of time adequate for its intended use. The display cabinet of my invention is so constructed that it may be made of paperboard, preferably corrugated paperboard, with resultant low cost and light weight, and possesses adequate mechanical strength for its intended use. The elements of the cabinet are so constructed and arranged that they can be set up or assembled with expedition and facility and as readily disassembled and, when disassembled, can be folded flatwise so as to occupy but little space, for shipment or storage. Further objects and advantages of my invention will appear from the detailed description.

In the drawings:

Figure 3 is a lengthwise central vertical sectional view of the cabinet of Figure 1, on an enlarged scale;

Figure 4 is a sectional view of the upper portion of the cabinet taken substantially on line 4—4 of Figure 3; and Figure 5 is a sectional view taken substantially on line 5—5 of Figure 3.

Figure 1:
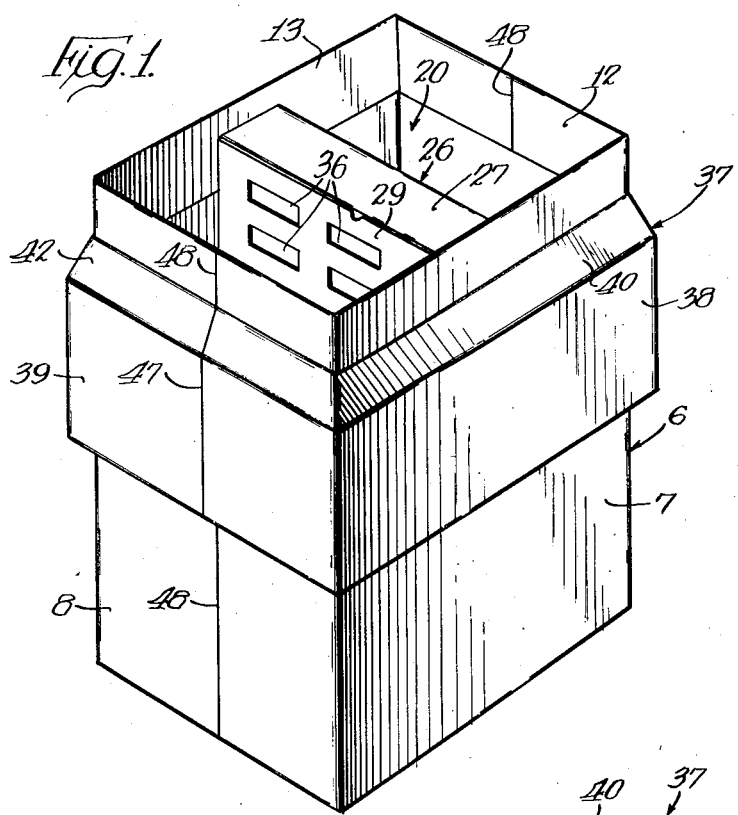
Figure 1 is a perspective view of a frozen food display cabinet embodying my invention.

The cabinet of my invention includes a body 6 conveniently in the form of a tube of rectangular cross section comprising side wall panels 7 and end wall panels 8, one of the side wall panels being provided, at one end thereof, with a glue flap 9 which seats on and is adhesively secured to the inner face of the adjacent end wall panel 8. Each of the end wall panels 8 is provided, at its lower edge, with a flange 10 attached thereto along a fold line and folded inward at right angles to the end wall panel 8, each of the side wall panels 7 being provided at its lower edge with a similar flange 11 folded inward and, at their end portions, overlying the flanges 10; as shown more clearly in Figures 2 and 3. Each end wall panel 8 is further provided, at its upper edge, with a flap 12 hinged thereto along a fold line and folded downward and inward of body 6, each side wall panel 7 being provided at its upper edge with a flap 13 attached thereto along a fold line and folded downward and inward of the body 6; as shown more clearly in Figures 3 and 4. The body 6 is formed of paperboard, preferably corrugated paperboard with the corrugations thereof extending vertically of the body.

Figure 2:
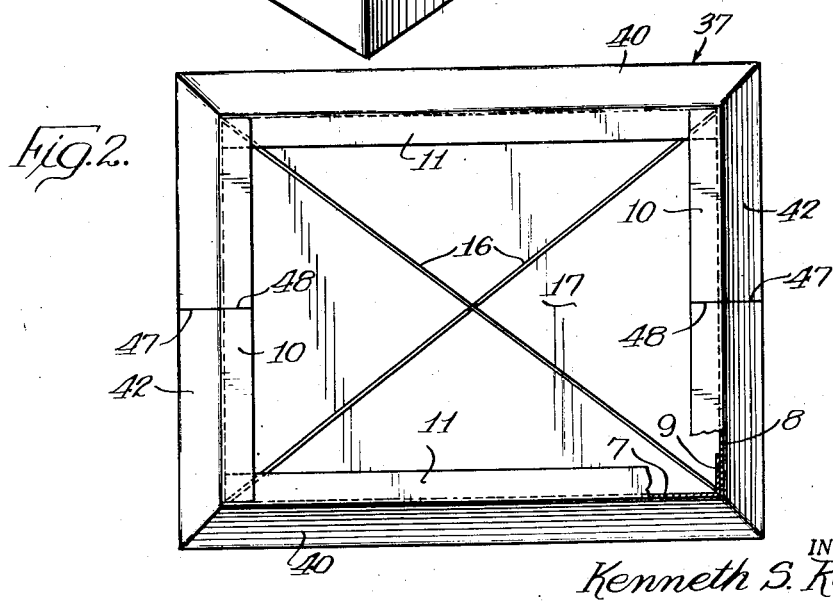
Figure 2 is an underneath view of the display cabinet of Figure 1.

Two spreaders 16, shown more clearly in Figures 2 and 3, are disposed in the lower portion of body 6 in crossed relation, each being slotted for one-half its height for interengagement with the other. The spreaders 16 are disposed diagonally of body 6 and seat in the corners thereof effective for holding the body in its extended set up condition. It will further be noted that the end portions of the spreaders 16 seat upon the upper faces of the flanges 11 of side wall panels 7, for a purpose to be explained presently. The spreaders 16 are of equal height with their upper edges disposed in a common horizontal plane. A platform 17, shown more clearly in Figures 3 and 4, and conveniently formed of a plurality of sheets 18 of paperboard, fits snugly within the body 6 and seats upon the upper edges of the spreaders 16. The platform 17 supplements the spreaders 16 in maintaining the body 6 in its extended set up condition. The spreaders 16 and the sheets 18 of platform 17 preferably are formed of corrugated paperboard, the corrugations of the spreaders 16 preferably being disposed vertically for maximum load supporting strength.

An open top tray 20 of rectangular cross section fits snugly in the upper portion of body 6 and seats upon the platform 17. The tray 20 is formed from a one-piece blank of paperboard, preferably corrugated paperboard, suitably scored or creased and folded to provide a bottom wall panel 21, two side wall panels 22 of substantial height, two end wall panels 23 of the same height as the side wall panels 22, and end flaps 24 of substantial length attached to each end of each of the end wall panels 23 along a fold line and extending between the side wall panels 22 of tray 20 and the side wall panels 7 of body 6, as shown more clearly in Figure 5. The inner surface of the tray 20, when in its set up condition, is provided with a thermal reflecting surface, conveniently in the form of a coating 25 of aluminum foil adhesively secured thereto. The flaps 24 are not secured to the side wall panels 22 of tray 20 and it will be understood, from what has been said, that when the tray is removed from the body of the cabinet, it may be folded flatwise for storage or shipment. The flaps 13, at the upper edges of the side wall panels 7 of body 6, fit snugly between the flaps 12 at the upper edges of the end wall panels 8 so as to hold the latter flaps in their downwardly and inwardly folded position as shown. The side wall panels 22 and the end wall panels 23 of tray 20 extend upwardly a short distance beyond the lower edges of the flaps 12 and 13 and are confined between the latter and the end and side wall panels 8 and 7 of body 6, as will be clear from Figures 3 and 4. A refigerant container 26, to be described more fully presently, is mounted in the tray 20 transversely thereof and spaced from the end wall panels 23. The refrigerant container 26 fits tightly in the tray 20 and holds the flaps 13 in their normal outer position in close proximity to the corresponding side wall panels 7, effective for restraining the tray side wall panels 22 against inward movement, flaps 13 serving to hold the flaps 12 against inward movement and the latter flaps effectively restraining the end wall panels 23 of the tray against inward movement. That assures that the tray 20 is maintained in its fully extended set up condition when mounted in the body 6 of the cabinet.

The refrigerant container 26 is formed from a one-piece blank of paperboard, preferably corrugated paperboard, suitably scored and folded to provide a bottom wall panel 28, front and back wall panels 29 and 30, respectively, a top closure panel 27 hinged to the upper edge of panel 30, and a locking flap 31a hinged to the front edge of panel 27. Referring to Figures 4 and 5, an inner end panel 31 extends rearward from each side of the front panel 29 and is provided, at its rearward edge, with a flap 32 of appreciable width which seats upon the inner face of the corresponding side portion of the back wall panel 30. An outer end wall panel 33 extends forwardly from each side edge of the back wall panel 30 and seats on the outer face of panel 31. The panel 33 is provided at its lower end with a flap 34 which extends inwardly through a corresponding slot at the lower end of panel 31 and seats on the upper face of the bottom wall panel 28, flap 34 fitting snugly between the panels 29 and 30. The outer end wall panel 33 is further provided, at its upper end, with a flap 35 which is folded downward and inward over the inner end wall panel 31 and has a tight friction fit between flap 32 and the front wall panel 29. The front and back wall panels 29 and 30 are provided with suitably disposed openings 36 and the retaining flap 31a of the cover panel 27 is cut so as not to obstruct any of such openings, as shown in Figure 3. A paperboard support 36a of substantially U-shape in cross section fits snugly in the lower portion of the container 26 for supporting therein two blocks (not shown) of frozen carbon dioxide, commonly termed Dry Ice. The blocks of Dry Ice may weigh as much as twenty-five pounds each and are separately wrapped. In practice, one of the blocks is unwrapped when the display cabinet is in use, the other block remaining wrapped until the first block has been consumed, after which the second block is unwrapped and put into use. Normally, each block will last approximately 24 hours, the cabinet thus having a refrigerating capacity of approximately 48 hours, which usually is adequate when the cabinet is to be used in connection with special displays or for pushing special articles during sales thereof. As will be understood from what has been said, none of the elements of the container 26 are permanently secured together and this container, when removed from the cabinet, may readily be folded flatwise by disconnecting the elements thereof and spreading the container out and then folding it upon itself in a manner which will be readily understood. The support 36a, when removed from the container 26, is also well suited to either spreading it out flat or folding flatwise upon itself. The foldability of the parts is desirable in respect to saving of space in storage or for shipment.

A jacket member 37 is mounted about body 6 of the cabinet in the zone of the tray 20. This jacket member 37 is formed from a one piece blank of paperboard, preferably corrugated paperboard with the corrugations thereof disposed vertically, cut and scored and folded to provide hingedly connected side and end wall panels 38 and 39, respectively. Upper and lower panels 40, which are relatively narrow, are hinged to the upper and lower edges of each of the panels 38 along fold lines and have hinged to their inner edges retaining flaps 41 of substantial width. Similarly, relatively narrow upper and lower panels 42 are attached to the upper and lower edges of each of the panels 39 along fold lines, each of the panels 42 having attached to its inner edge, along a fold line, a retaining flap 43 of substantial width. The panels 40 and 42 are separate from each other and the ends thereof are beveled to provide, in the assembled jacket member 37, a miter joint therebetween as shown. Referring to Figure 5, one of the side wall panels 38 of jacket member 37 has attached to one side edge thereof, along a fold line, a glue flap 44 which seats upon and is adhesively secured to the inner face of the adjacent side wall panel 38. A frame member 45, formed of paperboard, preferably corrugated paperboard with the corrugations thereof extending vertically, is disposed within the jacket member 37 and seats, at its upper and and lower edges, therein at the fold lines between the upper and lower panels 40 of the side panels 38 and the retaining flaps 41, and at the fold lines between the upper and lower panels 42 of the end wall panels 39 and the associated retaining flaps 43. The jacket member 37 fits tightly about body 6 with the retaining flaps 41 and 43 confined between frame member 45 and the side and end wall panels 38 and 39 of body 6, in frictional engagement therewith effective for retaining jacket member 37 on body 6 while permitting its removal therefrom. The jacket member 37 and the frame member 45 constitute an open frame which has a friction fit about body 6, as will be understood from the above.

It will be seen that the jacket member 37 provides a dead air space extending about body 6 in the zone of the tray 20 and effective as a thermal insulator therefor. The upper and lower panels 40 and 42 of the side and end wall panels 38 and 39 of jacket member 37, respectively, are inclined upwardly and downwardly toward the body 6 of the cabinet and effectively restrain the jacket member 37 against vertical displacement relative to the frame member 45. This frame member 45 is formed from a single strip of paperboard, preferably corrugated paperboard with the corrugations disposed vertically, suitably scored for folding into frame form. The jacket member 37 is provided, at each end thereof, with a crease providing a fold line 47 extending across panel 39 and the associated panels 42 and retaining flaps 43. When the jacket member 37 is removed from body 6, the upper and lower panels 40 and 42 and their associated retaining flaps 41 and 43 may be folded outward into the planes of the side and end wall panels 38 and 39, respectively, thus permitting ready removal of the frame member 45, after which the jacket member may be folded flatwise, with the end wall panels 39 thereof being folded inwardly along the fold line 47. Also the frame member 45 when removed from the jacket member 37 may be readily folded flatwise.

As previously noted, the spreaders 16 in conjunction with the platform 17 and tray 20 and associated parts effectively maintain the body 6 of the cabinet in its extended set up condition. Further, the weight of the tray 20 and the contents thereof is supported by the platform 17 and the spreaders 16, which rest upon the base flanges of the body 6. Accordingly, the load is transmitted directly to the base flanges of the body and thence to the floor or other supporting surface, thus relieving the body 6 of any substantial load. In that manner, the cabinet is well suited for supporting heavy loads. Further, by transmitting the load directly to the base flange of the cabinet, the latter is stabilized by the load so as to reduce possibility of tipping over the cabinet in the event of its being knocked against by passing persons. The body 6 of the cabinet is provided, at the center of each end wall panel 8 thereof, with a fold line 48 extending from top to bottom thereof and across the end flaps 12 and the end flanges 10. In disassembling the cabinet, the refrigerant container 26 is removed, after which the flaps 12 and 13 may be turned upwardly into the planes of the end and side wall panels 8 and 7, respectively. The tray 20 may then be removed, as may the platform 17 and spreaders 16 either through the upper end of the body or through the lower end thereof. The flanges 10 may then be turned into the planes of the end wall panels 8, and the body may be folded flatwise, with the end wall panels 8 folded inwardly upon themselves along the fold line 48. The spreaders 16, upon removal from the body 6, may be disengaged and disposed flatwise one upon the other. It will be clear, from what has been said, that the various elements of the cabinet, including the body 6 thereof, may all be folded flatwise so as to occupy but little space for convenience either in storage or for shipment. The complete cabinet, when disassembled and folded, may readily be shipped in an appropriate container of moderate size and, being formed of paperboard, is comparatively light and well suited for shipment. The various parts of the cabinet are not permanently secured together, being frictionally held in position, in general, and may readily be set up and assembled to produce the complete cabinet and as readily disassembled and folded flatwise for storage or shipment.

It will be understood that changes in detail may be resorted to without departing from the field and scope of my invention, and I intend to include all such variations, as fall within the appended claims, in this application in which the preferred form only of my invention is disclosed.

I claim:

1. In a portable frozen food display cabinet, a tubular body comprising hingedly connected wall panels and foldable flatwise, means for holding said body extended in set up condition comprising a platform fitting the interior of said body and otherwise free therefrom for removal, a tray fitting in the upper portion of said body and seating on said platform, said tray being free from said body and platform for ready removal and being foldable flatwise, and a hollow jacket member removably mounted on said body and extending thereabout in the zone of said tray providing a dead air space about the latter, said jacket member being foldable flatwise.

2. In a portable frozen food display cabinet, a tubular body comprising hingedly connected wall panels and foldable flatwise, said panels having inwardly extending flanges at their lower edges, interengaging spreaders fitting in the lower portion of said body at the hinge connections between said panels for holding said body in extended set up condition, said spreaders seating at their lower edges on said flanges, a platform fitting in said body and seating on the upper edges of said spreaders and free therefrom and from said body for removal, a tray fitting in said body and seating on said platform and free therefrom for ready removal, said tray being foldable flatwise, and a hollow jacket member frictionally mounted on said body and extending thereabout in the zone of said tray providing a dead air space about the latter, said jacket member being otherwise free from said body for ready removal therefrom and being foldable flatwise.

3. In a portable frozen food display cabinet, a tubular body of rectangular cross section comprising hingedly connected side and end wall panels having inwardly extending flanges at their lower edges, interengaging flat spreaders extending diagonally of said body between the corners thereof for holding said body in extended set up condition, said spreaders seating at their lower edges on said flanges and being disengageable from each other and free from said body for ready removal therefrom, a flat platform fitting in said body above and seating on said spreaders and free therefrom and from said body for ready removal therefrom, a tray fitting in said body and seating on said platform and free therefrom for ready removal, said tray being foldable flatwise, and a hollow jacket member frictionally mounted on said body extending thereabout in the zone of said tray providing a dead air space about the latter, said jacket member being otherwise free from said body for ready removal therefrom and being foldable flatwise.

4. In a portable frozen food display cabinet, a tubular body of rectangular cross section comprising hingedly connected side and end wall panels having inwardly extending flanges at their lower edges, interengaging flat spreaders extending diagonally of said body between the corners thereof for holding said body in extended set up condition, said spreaders seating at their lower edges on said flanges and being disengageable from each other and free from said body for ready removal therefrom, a flat platform fitting in said body above and seating on said spreaders and free therefrom and from said body for ready removal therefrom, a tray fitting in said body and seating on said platform and free therefrom for ready removal, said tray being foldable flatwise, a jacket member extending about said body in the zone of said tray, said jacket member comprising hingedly connected side and end panels respectively having an upper panel and a lower panel hinged to their upper and lower edges and retaining flaps hinged to the inner edges of said upper and lower panels, and a rectangular frame in said jacket member with its upper and lower edges seating therein at the hinge connections between said side and end panels and said upper and lower panels, said upper and lower panels being confined between said frame and said side and end wall panels of said body and spacing said side and end panels of said jacket member outward away from said side and end wall panels of said body providing a dead air space around said tray, said jacket member being otherwise free from said body for removal therefrom and being foldable flatwise, said frame being foldable flatwise.

5. In a portable frozen food display cabinet, a tubular body of rectangular cross section comprising hingedly connected side and end wall panels, a tray mounted in the upper portion of said body, a jacket member extending about said body in the zone of said tray, said jacket member comprising hingedly connected side and end panels respectively having an upper panel and a lower panel hinged to their upper and lower edges and retaining flaps hinged to the inner edges of said upper and lower panels, and a rectangular frame in said jacket member with its upper and lower edges seating therein at the hinge connections between said side and end panels and said upper and lower panels, said upper and lower panels being confined between said frame and said side and end wall panels of said body and spacing said side and end panels of said jacket member outward away from said side and end wall panels of said body providing a dead air space around said tray.

6. In a portable frozen food display cabinet, a tubular body of rectangular cross section comprising hingedly connected side and end wall panels, a tray mounted in the upper portion of said body, a jacket member extending about said body in the zone of said tray, said jacket member comprising hingedly connected side and end panels respectively having an upper panel and a lower panel hinged to their upper and lower edges and retaining flaps hinged to the inner edges of said upper and lower panels, and a rectangular frame in said jacket member with its upper and lower edges seating therein at the hinge connections between said side and end panels and said upper and lower panels, said upper and lower panels being confined between said frame and said side and end wall panels of said body and spacing said side and end panels of said jacket member outward away from said side and end wall panels of said body providing a dead air space around said tray, said upper and lower panels of said jacket member being respectively inclined upwardly and downwardly to said body member effective for resisting vertical displacement of said jacket member relative to said frame.

7. In a portable frozen food display cabinet, a tubular body of rectangular cross section comprising hingedly connected side and end wall panels, a tray mounted in the upper portion of said body comprising a bottom wall panel and upwardly extending side and end panels, side and end flaps hinged to the upper edges of said body wall panels and folded downward and inward into close proximity thereto, said side flaps having a tight fit between said end flaps, and a refrigerant container mounted in said tray transversely thereof spaced from said end flaps and fitting snugly between said side flaps, the upper edge portions of said tray panels being confined between said flaps and said side and end wall panels of said body.

8. In a portable frozen food display cabinet, a tubular paperboard body of rectangular cross section comprising hingedly connected side and end wall panels, interengaging flat paperboard spreaders extending diagonally of said body between the corners thereof for holding said body in extended set up condition, said spreaders being disengageable from each other and free from said body for removal therefrom, said body being foldable flatwise, a flat paperboard platform fitting in said body above and seating on said spreaders and free therefrom and from said body for ready removal therefrom, a paperboard tray fitting in said body and seating on said platform and free therefrom for ready removal, said tray being foldable flatwise, a hollow paperboard jacket member frictionally mounted on said body extending thereabout in the zone of said tray providing a dead air space about the latter, said jacket member being otherwise free from said body for ready removal therefrom and being foldable flatwise, and a paperboard refrigerant container fitting in said tray removable therefrom and foldable flatwise.

9. In a portable food display cabinet, a tubular body, a tray mounted in the upper portion of said body, and an open frame having a friction fit on said body and otherwise free therefrom for ready removal and replacement, said frame including a hollow jacket member closed at its top and bottom and extending about said body exteriorly thereof in the zone of said tray providing a dead air space about the latter, said jacket member being spaced above the bottom of said body.

References Cited in the file of this patent

UNITED STATES PATENTS

| | | |
|---|---|---|
| 1,595,385 | Cusack | Aug. 10, 1926 |
| 1,986,263 | Hatch | Jan. 1, 1935 |